United States Patent
Hanchett

(10) Patent No.: US 11,069,945 B1
(45) Date of Patent: Jul. 20, 2021

(54) METHODS AND APPARATUS FOR A BATTERY AND REGULATING THE TEMPERATURE OF BATTERIES

(71) Applicant: Atlis Motor Vehicles Inc., Mesa, AZ (US)

(72) Inventor: Mark A. Hanchett, Mesa, AZ (US)

(73) Assignee: Atlis Motor Vehicles, Inc., Mesa, AZ (US)

( * ) Notice: Subject to any disclaimer, the term of this patent is extended or adjusted under 35 U.S.C. 154(b) by 226 days.

(21) Appl. No.: 16/379,019

(22) Filed: Apr. 9, 2019

Related U.S. Application Data

(60) Provisional application No. 62/694,748, filed on Jul. 6, 2018.

(51) Int. Cl.
| | | |
|---|---|---|
| *H01M 50/54* | (2021.01) | |
| *H01M 10/6553* | (2014.01) | |
| *H01M 10/613* | (2014.01) | |
| *H01M 10/6556* | (2014.01) | |
| *H01M 50/543* | (2021.01) | |

(52) U.S. Cl.
CPC ......... *H01M 50/54* (2021.01); *H01M 10/613* (2015.04); *H01M 10/6553* (2015.04); *H01M 10/6556* (2015.04); *H01M 50/543* (2021.01)

(58) Field of Classification Search
CPC .. H01M 50/54; H01M 50/543; H01M 10/613; H01M 10/6553; H01M 10/6556
See application file for complete search history.

(56) References Cited

U.S. PATENT DOCUMENTS

| | | | |
|---|---|---|---|
| 5,436,548 A | 7/1995 | Thomas | |
| 5,585,206 A * | 12/1996 | Morris | H01M 6/46 429/161 |
| 9,246,169 B2 | 1/2016 | Matsumoto | |
| 9,391,326 B2 | 7/2016 | Yamamoto | |
| 2004/0038124 A1* | 2/2004 | Hisamitsu | H01M 10/0445 429/161 |
| 2014/0087237 A1* | 3/2014 | Dhar | H01M 10/14 429/160 |
| 2015/0017519 A1* | 1/2015 | Cho | H01M 50/543 429/179 |
| 2016/0111713 A1 | 4/2016 | Yamazaki | |
| 2017/0194610 A1 | 7/2017 | Tschiggfrei | |
| 2017/0324086 A1 | 11/2017 | Nitta | |
| 2018/0219191 A1* | 8/2018 | Drews | H01M 10/654 |
| 2018/0241023 A1 | 8/2018 | Lim | |

* cited by examiner

*Primary Examiner* — Jimmy Vo

(74) *Attorney, Agent, or Firm* — Letham Law Firm PLLC; Lawrence Letham

(57) ABSTRACT

A battery that includes collectors with tabs that are wide with respect to the area of the collector. The wide tabs present a low electrical and thermal resistance to improve the flow of current and/or heat to and from the collector thereby improving electrical and thermal performance of the battery. The battery further includes terminals with a channel that supports the flow of medium (e.g., liquid) to heat and/or cool the battery. The terminals may include fins or pins to increase the surface area of the terminal to improve thermal transfer to and from the battery and collectors of the battery. The batteries may be formed into a battery module that includes a system for monitoring and regulating the temperature of the batteries of the module.

17 Claims, 7 Drawing Sheets

METHODS AND APPARATUS FOR A BATTERY AND REGULATING THE TEMPERATURE OF BATTERIES

FIELD OF THE INVENTION

Embodiments of the present invention relate to batteries and regulating the temperature of batteries.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

Figure 1:
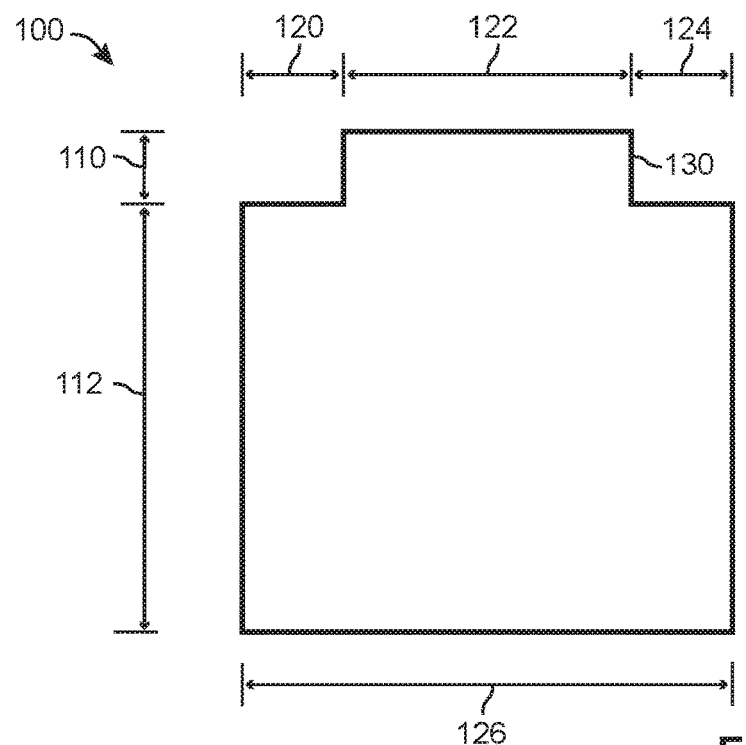
FIG. 1 is a diagram of a collector of a battery according to the present disclosure.
Figure 2:
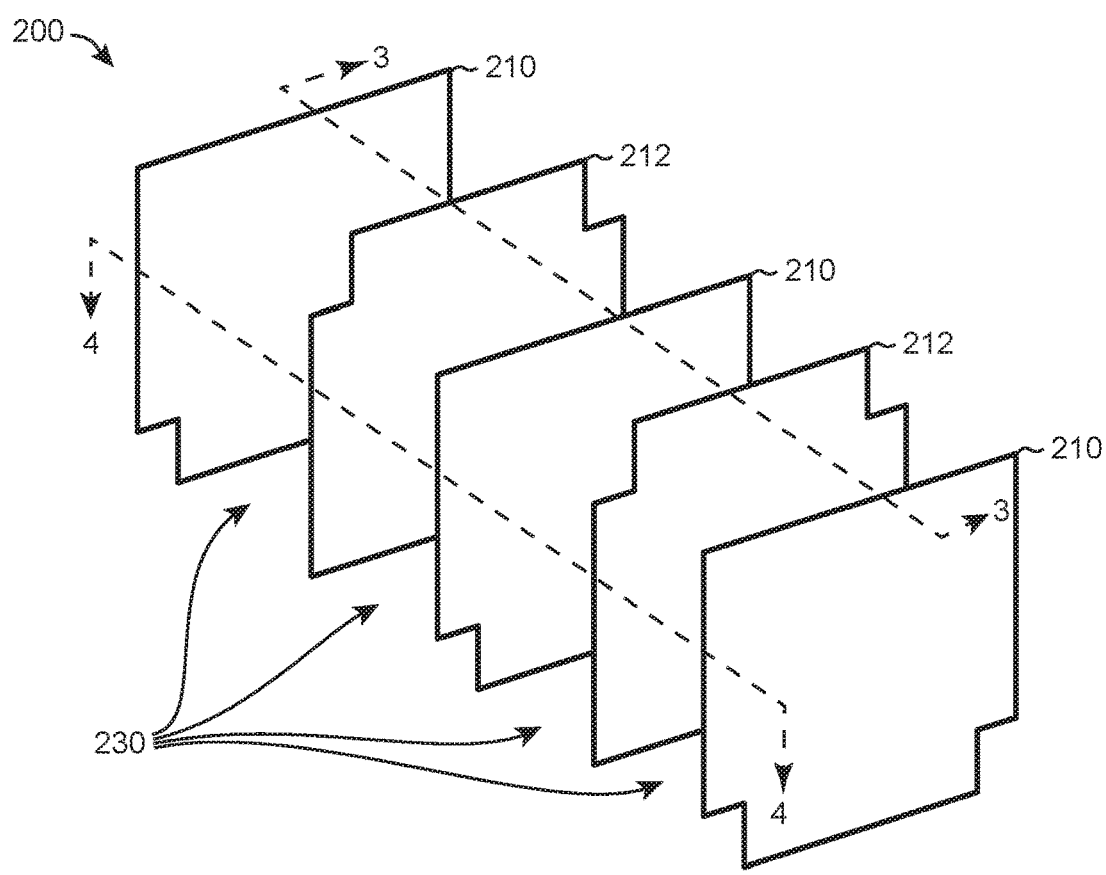
FIG. 2 is a perspective view of a plurality of collectors of FIG. 1 arranged for a battery cell according to the present disclosure.

The following disclosure relates to secondary batteries that may be charged and discharged multiple times. The current provided during discharge of the battery may be used to provide power to an electrical, electro-mechanical, or electronic device. In an application, the current from a battery as disclosed herein may be used to power the electrical, electro-mechanical, and electronic systems of a vehicle.

The battery disclosed herein may include any type of secondary cell that uses any type of chemistry (e.g., chemicals, elements) for storing and providing an electric current. For example, the chemistry of the battery may include aluminum-ion, lead-acid (e.g., deep cycle, VRLA, AGM), lithium-ion (e.g., lithium cobalt oxide, lithium ion), manganese oxide, lithium ion polymer, lithium iron phosphate, lithium-sulfur, lithium-titanate, thin film lithium ion), magnesium-ion, nickel-cadmium, nickel hydrogen, nickel metal hydride, and nickel magnesium cobalt.

The battery disclosed herein includes an anode and a cathode. During discharge of the battery, the anode performs the function of the negative electrode of the battery. During discharge of the battery, the cathode performs the function of the positive electrode of the battery.

The discharge ratings of the battery disclosed herein may be in the range of 2C to 5C maximum where a 1C rating provides one hour of discharge. The charge ratings of the battery may be in the range of 4C to 5C.

The battery disclosed herein may be heated or cool. Heat may be extracted from or provided to the battery via a liquid medium (e.g., water, mineral oil, ethylene glycol). The battery may include structures to increase the thermal conductivity of the battery. The battery may include structures to reduce the electrical resistivity of the battery.

The terms cell, battery cell, or battery are used interchangeable to refer to the combination of structure (e.g., collectors, separators, electrodes, case) and chemistry, as discussed above and herein, that cooperate to store and provide a current. A battery may provide a current at a voltage of between 1.5 volts and 9 volts, preferably at a voltage of between 3 volts and 4.5 volts. The voltage range provided by a battery may depend on the chemistry used to store and discharge the current.

Two or more cells, battery cells, and/or batteries may be combined (e.g., electrically coupled, mechanically coupled) to form a battery module. The batteries of a battery module may be electrically coupled in series and/or in parallel.

A battery may include one or more anode collectors, one or more cathode collectors, anode active material, cathode active material, separators, electrolyte, an anode terminal, a cathode terminal, and a case (e.g., housing).

A collector may be formed as a sheet of thin material (e.g., foil). The thickness of the material that forms a collector may be in the range of 0.1 micrometers to 250 micrometers. A collector may be formed of a metal (e.g., aluminum, tin, lead, copper, nickel, gold, zinc, lithium) or combination of metals. A collector may have any suitable shape. A collector may be substantially square, round, or rectangular. A collector may be shaped to increase thermal conductivity and/or reduce electrical resistivity. A collector may be formed of a material with a low electrical resistance and/or a low thermal resistance. A thickness of a collector may be relatively uniform. Portions of a collector (e.g., a tab) may have a thickness that is uniform, but greater than the thickness of the other portions of the collector.

A collector may perform the function of an anode collector or a cathode collector. A collector may be combined with anode active material to form an anode collector. Any material may be used as anode active material or cathode active material that is suitable with the chemistry of the battery and/or the material that forms the collector. Anode active material and/or cathode active material may include a binder that holds the active material together and/or binds the active material to the collector. Active material may be positioned on one side or both sides of a collector.

Anode active material may include any material suitable for the chemistry of the battery, the material of the anode collector and/or the material of the cathode collector. For example, the anode active material for a battery that uses a form of lithium chemistry may include graphite and copper (e.g., graphite coated on copper foil).

Cathode active material may include any material suitable for the chemistry of the battery, the material of the anode collector and/or the material of the cathode collector. For example, the cathode active material for a battery that uses a form of lithium chemistry may include lithium nickel cobalt manganese oxide, lithium manganese oxide, or lithium cobalt oxide.

A separator separates an anode collector from one or more cathode collectors. A separator may separate (e.g., keep separate) anode active material and cathode active material. A separator may function as a catalyst that promotes the movement of ions between an anode and a cathode. A separator may be porous. The pores of a separator may be evenly spaced. Ions may pass through the pores of the separator. A separator may be formed of a material that is non-conductive (e.g., not electrically conductive). For example, a separator may be formed a ceramic material. Other materials suitable for a separator include polyolefin films, nylon, and cellophane. A separator may be surrounded by, immersed in, and/or in contact with an electrolyte.

An electrolyte includes any material suitable for a chemistry that facilitates the transport of ions between an anode and a cathode. An electrolyte may include soluble salts, acids or other bases. An electrolyte may produce ions through a chemical reaction. The consistency (e.g., viscosity) of an electrolyte may range from a powder to paste to a liquid. For example, an electrolyte for a form of lithium chemistry may include lithium salts with ethylene carbonate.

A terminal is formed of an electrically conductive material (e.g., low electrical resistance). For example, a terminal may be formed of a metal (e.g., aluminum). A terminal electrically couples to one or more collectors of a battery. A terminal may be positioned, at least partially, on an exterior of the case of the battery to enable electrical and mechanical coupling to the battery. A terminal may be formed of a material that facilitates the flow of current through the terminal. A terminal may be formed of a material that facilitates the flow of current to and from the one or more collectors coupled to the terminal. A terminal may facilitate the flow of current by presenting a low resistance to a current.

One terminal may couple to anode collectors while another terminal may couple to cathode collectors. A terminal that couples to anode collectors may be referred to as an anode terminal or the negative terminal of a battery. A terminal that couples to cathode collectors may be referred to as a cathode terminal or the positive terminal of a battery. An anode terminal is kept electrically separate from a cathode terminal. An anode terminal and a cathode terminal cooperate to provide a current to a load. An anode terminal and a cathode terminal cooperate to receive a current to recharge a battery.

A terminal may also be formed of a material that is thermally conductive (e.g., low thermal resistance). For example, a terminal may be formed of a metal (e.g., aluminum). A terminal may facilitate the transfer of heat. A terminal may facilitate a transfer of heat to or from a collector. A terminal may facilitate a transfer of heat to and from a battery and/or a battery module. A terminal may include structures (e.g., fins, radiators, plates) for increasing a surface area of the terminal to increase a transfer of heat to and/or from the terminal. A terminal may include a duct (e.g., cavity, channel). A medium (e.g., air, liquid) may flow through the duct to facilitate the transfer of heat to and from the collectors via the terminals.

A terminal may be coupled to one or more collectors in such a manner so as to not increase an electrical and/or thermal resistance of the terminal or the collector, at least not significantly. A collector may have an electrical resistance. A terminal may have an electrical resistance. Coupling the terminal to the collector couples the electrical resistance of the terminal in series with the electrical resistance of the collector. If the coupling (e.g., area of contact, connection) between the terminal and the collector includes an electrical resistance, then the electrical resistance of the collector and terminal is increased by the electrical resistance of the coupling. If the electrical resistance of the coupling is greater than the resistance of the collector and/or the resistance of the terminal, then the resistance of the collector coupled terminal may increase significantly.

A coupling formed of a low resistance material (e.g., metal) may reduce the resistance of the coupling and thereby avoiding a substantial increase the resistance of the collector and terminal. For example, welding a metal collector to a metal terminal might provide a coupling with a low resistance.

A case may enclose (e.g., house, contain, surround) a battery. A case may enclose all or substantially all of the material of the one or more collectors of the battery, the anode active material, the cathode active material, the separator, and the electrolyte. A case may enclose at least a portion of the two or more terminals of a battery. A case may perform the function of one terminal of a battery. A case may be formed of a material that is suitable for containing the above. A case may be formed of a rigid material (e.g., metal, plastic). A case may be formed of a flexible material (e.g., plastic, mylar, polymer). A case may contain a liquid electrolyte. A case may include one or more vents or venting an excess buildup of pressure inside the battery. A case may be formed of a material that is thermally conductive. In an implementation, case 550 is formed of a metal.

In an implementation, battery 300 of FIGS. 1-7, includes cathode collectors 210, anode collectors 212, chemistry 230, case 550, anode terminal 512 and cathode terminal 510. Chemistry 230 includes anode active material 312, separator 314, cathode active material 310, and electrolyte 316.

Chemistry 230 may also be referred to as a unit of chemicals. A unit of chemicals may be positioned between to collectors. The unit of chemicals interacts with the collectors so that one collector performs the functions of an anode collector while the other collector performs the functions of a cathode collector. As discussed below, a unit of chemicals may include anode active material, cathode active material, a separator, and an electrolyte.

Cathode collector 210, anode collector 212, chemistry 230, and case 550 include the structure and materials and perform the functions of a cathode collector, anode collector, chemistry, and case respectively as discussed above. Anode terminal 512 and cathode terminal 510 include the structure and materials and perform the functions of a terminal discussed above.

Chemistry 230 includes anode active material 312, separator 314, cathode active material 310, and electrolyte 316. Chemistry 230 is positioned between an anode collector and a cathode collector. Tab 130 of each anode collector 212 couples to anode terminal 512. Tab 130 of each cathode collector 210 couples to cathode terminal 510. Tabs 130 of each collector couples to its respective terminal along the entire width (e.g., 122) of tab 130 to provide parallel paths for current flow to and from the collector. Parallel paths through tab 130 present a low electrical and/or thermal resistance to currents and heat that enter and leave the collector.

In this implementation, the cathode collectors 210 and anode collectors 212 are formed of aluminum or copper. Each cathode terminal 510 and anode terminal 512 is formed of aluminum or copper. Each cathode collector 210 and anode collector 212 is welded to its respective terminal 510 or 512.

Cathode collectors 210 and anode collectors 212 are formed in accordance with collector 100. Collector 100 is formed of a thin sheet (e.g., foil) of material. In an implementation, collector 100 is formed of aluminum or copper. The characteristics of collector 100 may include the characteristics of a collector discussed above. Collector 100 has width 126 and height 112. Width 126 and height 112 of collector 100 form an area of any size that is suitable for the chemistry used in battery 300. The area bounded by width 126 and height 112 may be referred to as the active area of a collector or simply the area of a collector. The active area interacts with the chemicals of the battery chemistry to perform the functions of a battery.

In an implementation, width 126 is equal to height 112. If an upward direction is considered 0 degrees and a downward direction 180 degrees, the area of adjacent collectors may be aligned with the tab of adjacent collectors oriented in a direction of 0, 90, 180 and 270 degrees. In implementation show in FIG. 2, the tabs of collectors are alternately oriented at 0 and 180 degrees. The tabs of collectors may also be alternately oriented at 0 and 90, 0 and 270, 90 and 270 without overlapping the tabs of adjacent (e.g., anode and cathode) collectors.

In another implementation, width 126 is in the range of 40-50 millimeters, preferably about 45 millimeters. Height 112 is in the range of 50 to 60 millimeters, preferably 55 millimeters. The area of collectors of these dimensions may be aligned by orienting the tab of one collector at 0 degrees and the tab of another collector at 180 degrees.

Collector 100 includes tab 130. Tab 130 extends from the area. Tab 130 extends from the area in a direction. Tab 130 has height 110 and width 122. Width 122 of tab 130 is at least 70 percent of width 126. Preferably, width 122 is at least 80 percent of width 126. The width of tab 130 reduces electrical and/or thermal resistance between the terminal to which the tab is coupled and the area of the collector. Preferably, width 120 and 124 are equal so that tab 130 is centered with respect to width 126.

Height 110 of tab 130 is sufficient to permit tab 130 to couple to either cathode terminal 510 or 512. In an implementation, height 110 is at least 12 millimeters which means tab 130 extends at least 12 millimeters from the area of the electrode.

Figure 6:
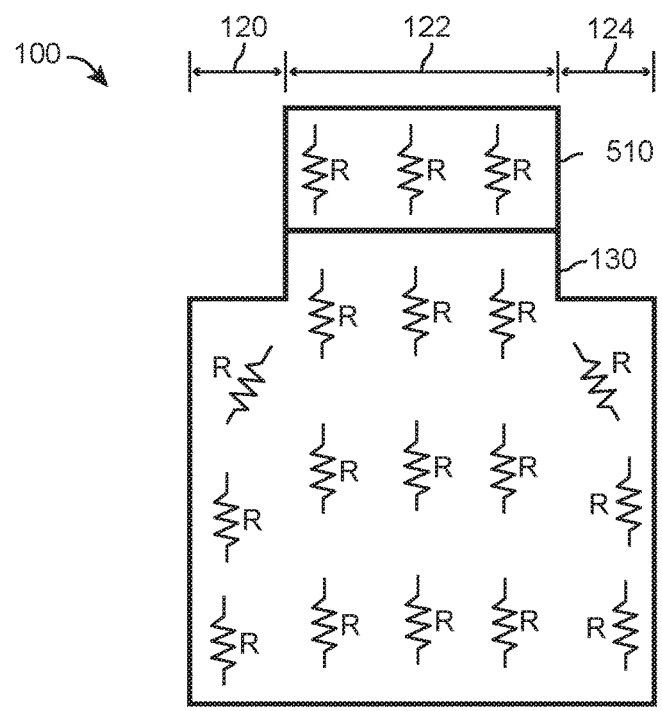
FIG. 6 is a diagram of a collector showing the electrical or thermal resistance thereof.
Figure 7:
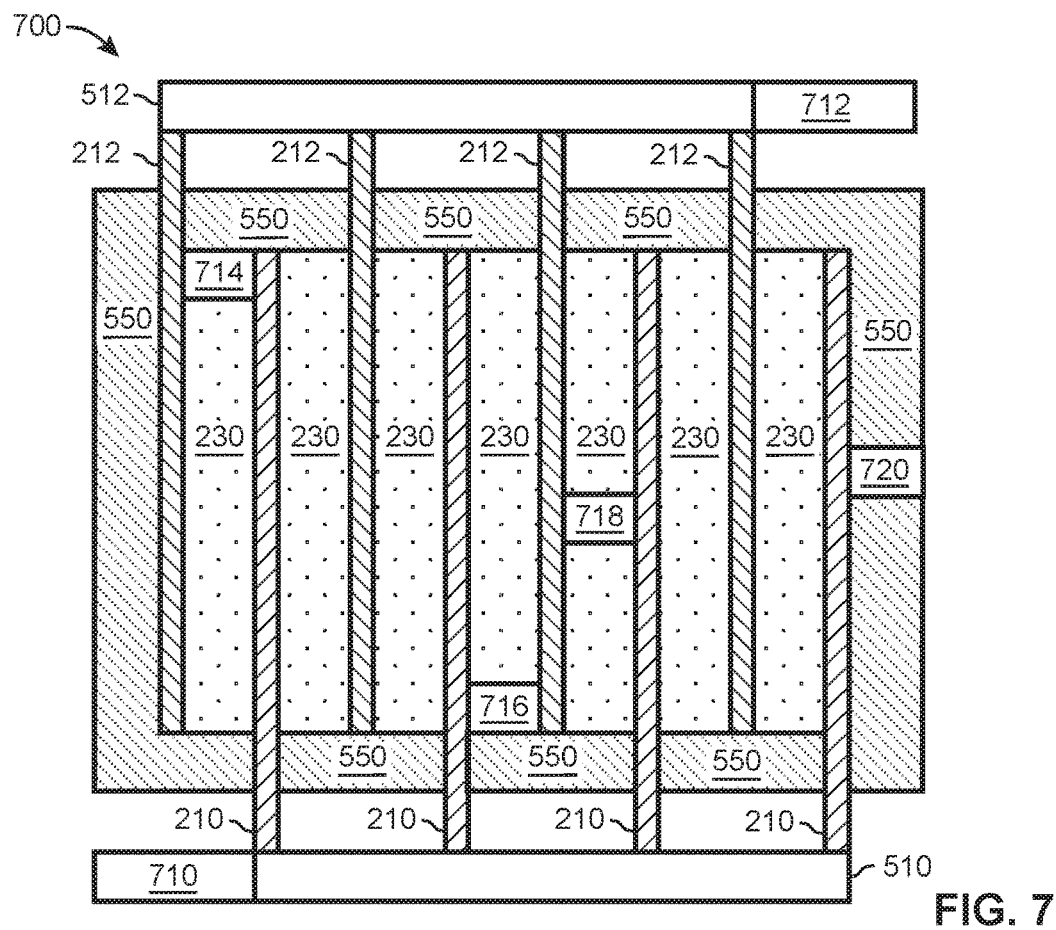
FIG. 7 is the cross-section of the battery cell of FIG. 5 with temperature sensors.

The electrical and thermal resistance of collector 100 and cathode terminal 510 are shown in FIG. 6. The material of collector 100 is a thin sheet. The resistors R shown in FIG. 6 illustrate the resistance of the material at any point in tab 130, the area of collector 100, and cathode terminal 510. The resistors of the area of collector 100, tab 130, and cathode terminal 510 are perceived by a current as being in parallel. Because there are many resistors are in parallel, the area of collector 100, tab 130 and cathode terminal 510 present a low electrical and thermal resistance to a current that flows along the entire width of tab 130. Currents that flow in to or out of the area of a collector flow along an entire width of tab 130.

Another way to assess the resistance of tab 130 with respect to its width to determine the squares of material through which the current or heat must flow. A square of sheet material has a resistance. Because the path of current flow through tab 130 is many squares wide (e.g., about 5; width 122 divided by height 110) and only one square long (e.g., height 110), the resistance through tab 130 is proportional to width 122/height 110. (e.g., Rtab130=Rsheet*(width 122/height 110)). As the width of tab 130 decreases, the resistance, both electrical and thermal, increases. The width (e.g., 122) of tab 130 with respect to the width (e.g., 126) and height (e.g., 112) of the area of the collector is very beneficial to the operation of the battery because the wide width provides a low resistance path between the terminal and the area of the collector. The low resistance path increases the density of the current that may be provided to or received from the collector and the rate at which heat may be provided to or removed from the collector.

The thickness of the material of tab 130 also affects the resistance of tab 130. As the thickness of the material increases, the resistance to electricity and heat transfer decreases.

Two or more collectors 100 are positioned with respect to each other to form cathode collectors 210 and anode collectors 212 of a battery. In placement 200, cathode collectors 210 and anode collectors 212 are alternately positioned with respect to each other. In placement 200, cathode collectors are positioned so that tab 130 of each cathode collector 210 is positioned downward, while anode collectors 212 are positioned so that tab 130 of each anode collector 212 is positioned upward. Using the degree notation for orientation discussed above, the tabs of the anode collectors 212 are oriented in the direction of 0 degrees while the tabs of the cathode collectors 210 are oriented in the direction of 180 degrees. The difference in the direction of orientation of the tabs of the anode collectors 212 with respect to the tabs of the cathode collectors 210 is 180 degrees. Tabs 130 of the anode collectors 212 do not overlap the tabs of cathode collectors 210. Further, Tabs 130 of anode collectors 212 do not overlap that area (e.g., height 112 by width 126) of the cathode collectors 210 and tabs 130 of cathode collectors 210 do not overlap the area of anode collectors 212.

Placement 200 shows how two or more sheet-like collectors are stacks to form a battery. Chemistry (e.g., a unit of chemicals) is placed between collectors. The chemical make-up (e.g., active material) of the chemistry between collectors causes a collector to operate as an anode collector or a cathode collector.

In an implementation, the area (e.g., height 112 by width 126) of a cathode collector 210 aligns with the area of an anode collector so that tab 130 of the cathode collectors 210 extend from the bottom of placement 200 while tab 130 of anode collectors 212 extend from the top of placement 200. As a result of placement 200, cathode collectors 210 extend from the bottom of the battery 300 while anode collectors 212 extend from the top of the battery 300.

In another implementation, the tabs of the anode collectors 212 are oriented at 0 degrees while the tabs of the cathode collectors are oriented at 90 or 270 degrees. The difference in the direction of orientation of the tabs of the anode collectors 212 with respect to the tabs of the cathode collectors 210 is 90 degrees. The tabs of the anode collectors 212 do not overlap the tabs of the cathode collectors 210. The tabs of the anode collectors 212 do not overlap that area of the cathode collectors 210 and the tabs of the cathode collectors 210 do not overlap the area of the anode collectors 212.

Chemistry 230 is positioned between cathode collectors 210 and anode collectors 212 as shown in FIGS. 2-5 and 7. Chemistry 230 includes any of the chemistries (e.g., chemicals, compounds, elements) discussed above. Chemistry 230 includes any chemistry suitable for the material of cathode collectors 210 and anode collectors 212. Chemistry 230 may come into contact with cathode collector 210 and/or anode collector 212. Chemistry 230 may adhere (e.g., stick) to cathode collector 210 and/or anode collector 212. Chemistry 230 does not contact tab 130 of cathode collectors 210 or anode collectors 212. Chemistry 230 interacts with cathode collectors 210 and anode collectors 212 to perform the functions of the battery, such as storing and providing a current.

Battery 300 may include any number of cathode collectors 210 and anode collectors 212 for a type of battery, a chemistry used, a voltage delivered, and/or a current delivered and/or received.

Figure 3:
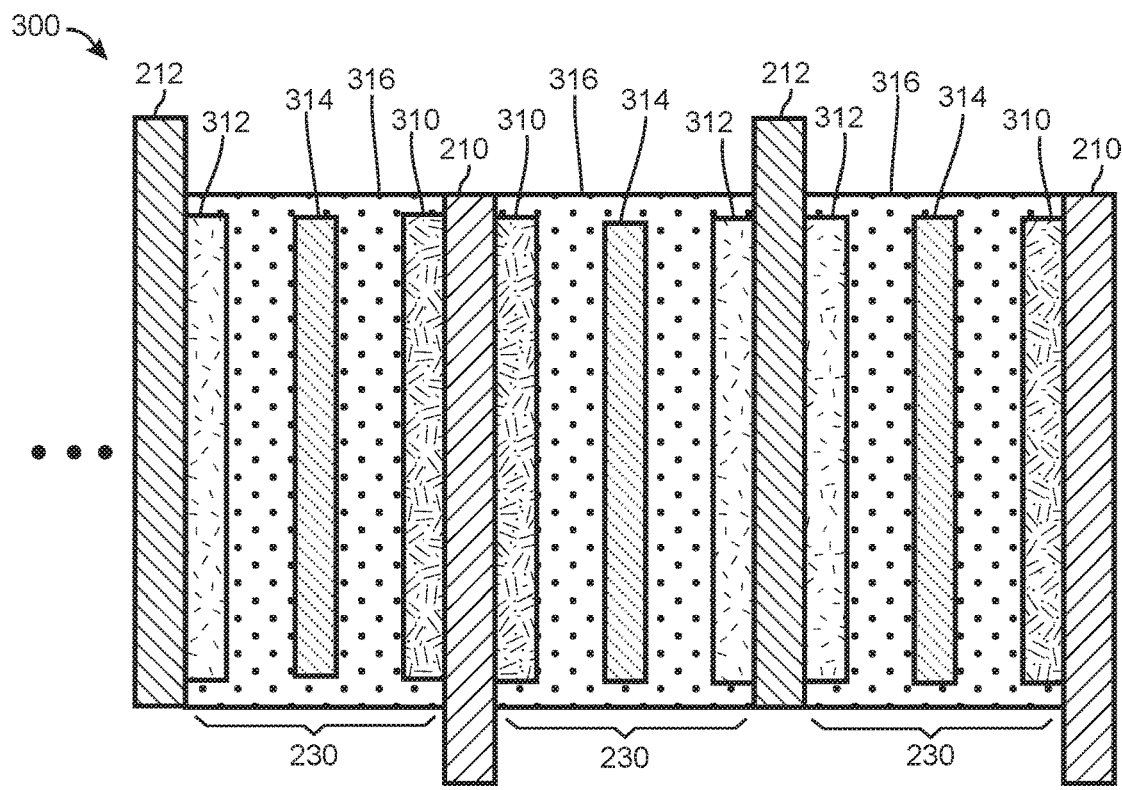
FIG. 3 is a cross-section of a battery cell along line 3-3 of FIG. 2.
Figure 4:
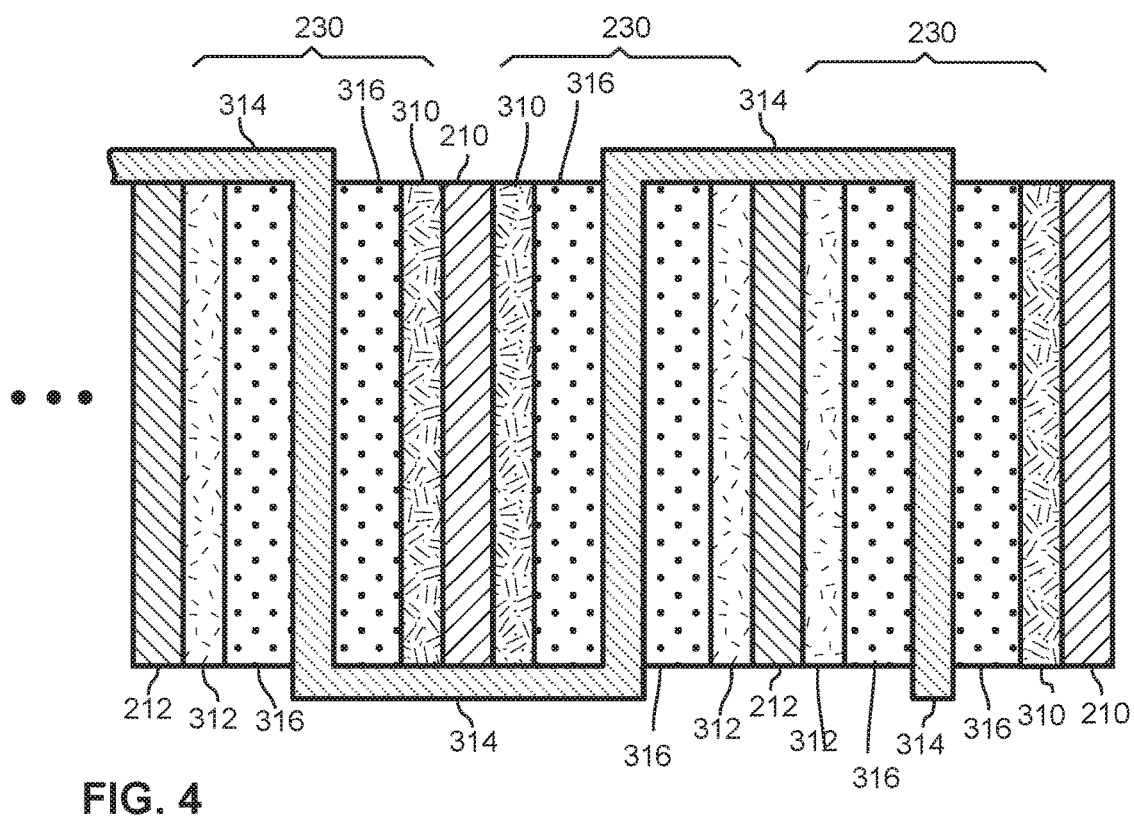
FIG. 4 is a cross-section of a battery cell along line 4-4 of FIG. 2.

The cross-section along line 3-3 shown in FIG. 3 illustrates how the tabs of anode collectors 212 extend above battery 300 and the tabs of cathode collectors 210 extend below battery 300. The extension of tabs 130 above and below battery 300 provide parallel paths to each collector to provide a current to recharge battery 300, receive a current to discharge battery 300, provide heat to heat battery 300 and remove heat to cool battery 300. The parallel paths reduce electrical and thermal resistance of the collector and battery 300.

The width of tab 130 of each collector provides a low resistance path for current flow (e.g., charging, discharging) or heat transfer (e.g., provide heat, remove heat). Tab 130 should be coupled to cathode terminal 510 or anode terminal 512 along an entire width of tab 130 to preserve the wide, low resistance path for current flow and heat transfer. The structure (e.g., coupler) that couples tabs 130 to cathode terminals 510 and anode terminals 512 respectively should also be of a low electrical and thermal resistance so as to not introduce a high resistance in the wide path that tab 130 provides between the terminal and the area of the collector. For a collector and terminal formed of metal, welding tab 130 to the terminal across the entire width of tab 130 provides a low resistance coupling of tab 30 to the terminal. The weld joint represents a low resistance coupler.

The thickness of tab 130, not width 122 but the thickness of the material of tab 130, may be thicker than the thickness of the area of collector 100 to reduce the electrical and/or thermal resistance between a terminal and the area of collector 100. Tab 130 may include ribs, not shown, of thicker material positioned across tab 130 between the end of tab 130 and the area of collector 100. The ribs provide additional low resistance, parallel paths between a terminal and the area of collector 100. A rib may extend from tab 130 into the area of collector 100 to decrease the resistance of a portion of the area and/or to provide parallel paths for current and heat flow.

Figure 5:
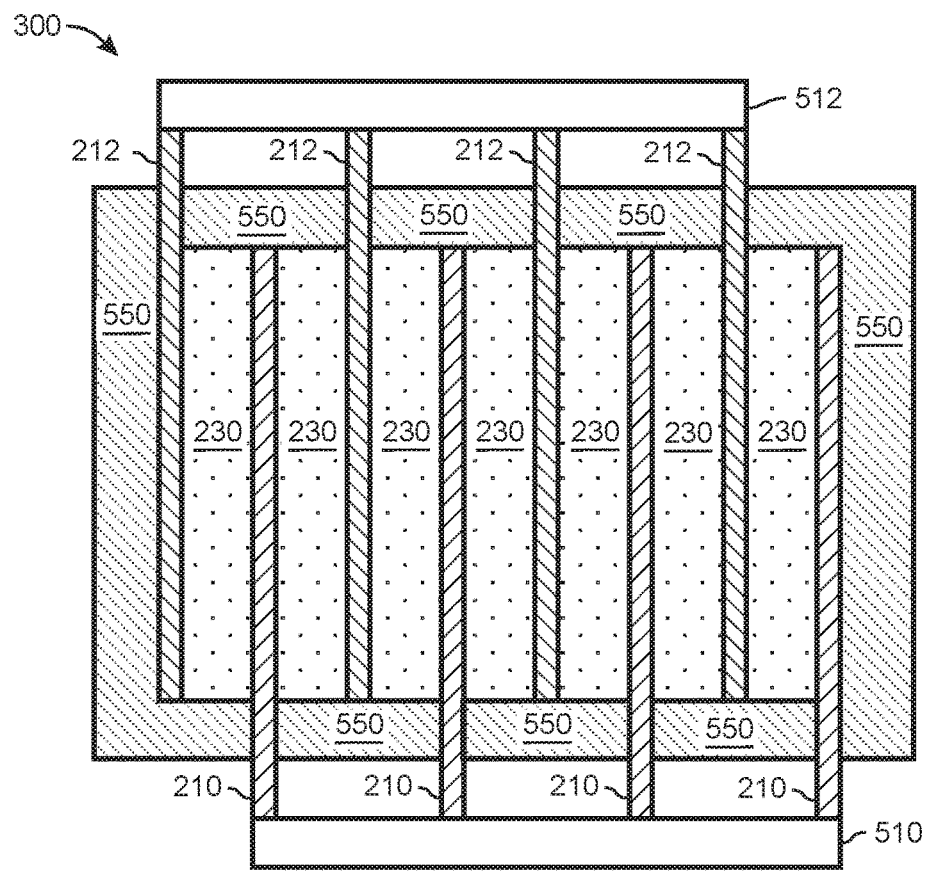
FIG. 5 is a cross-section of a battery cell along line 4-4 of FIG. 2 with a container and terminals.

In an implementation, the electrical resistance between any location on area of a collector to cathode terminal 510 or anode terminal 512, refer to FIG. 5, is between 1 and 10 milliohms. The resistance to heat transfer between any location on the area if the cathode to cathode terminal 510 or anode terminal 512 is similarly low. Width 122 of tab 130 provides a wide, low resistance path, both electrically and thermally, between cathode terminal 510 and the area of the collector. A low resistance coupler between tab 130 and cathode terminal 510 increases the resistance of cathode terminal 510 to any location on the area of the collector, but only by a small amount. Further, because the coupler is along the entire length of tab 130, the coupler also provides may parallel paths for current flow and heat transfer. In an implementation, each cathode collector 210 and each anode collector 212 is formed of aluminum and is welded to its respective cathode terminal 510 and anode terminal 512, which are also formed of aluminum. Welding provides a low electrical and thermal resistance between tab 130 and the terminal.

Anode active material 312 is positioned next to or couples to one or both sides an anode collector 212. Anode active material 312 performs the functions of an anode active material discussed above. Cathode active material 310 is positioned next to or couples to one or both sides a cathode collector 210. Cathode active material 310 performs the functions of a cathode active material discussed above.

Separator 314 is positioned between anode active material 312 and cathode active material 310. Separator 314 separates anode active material 312 from cathode active material 310. Separator 314 is formed of a porous material (e.g., ceramic). Separator 314 permits the passage of ions between anode collector 212 and cathode collector 210. Separator 314 snakes through, refer to FIG. 4, battery 300. Separator 314 provides some rigidity to the structure of battery 300.

Electrolyte 316 is position in and around separator 314, anode active material 312, and cathode active material 310. Electrolyte 316 performs the functions of an electrolyte as discussed above.

Case 550 encloses anode active material 312, separator 314, cathode active material 310, electrolyte 316, and the area (e.g., width 126 by height 112) of anode collectors 212 and cathode collectors 210. Tab 130 of anode collectors 212 and cathode collectors 210 extend through case 550. Case 550 may include the materials and perform the functions of a case as discussed above. Anode terminal 512 couples to tab 130 of each anode collector 212. Cathode terminal 510 couples to tab 130 of each cathode collector 210. Cathode terminal 510 and/or anode terminal 512 may be position wholly or partially outside of case 550. Cathode terminal 510 and/or anode terminal 512 may couple to case 550. Cathode terminal 510 and anode terminal 512 are kept electrically separate from each other. Separating cathode terminal 510 and anode terminal 512 reduces the likelihood of shorting out battery 300.

Cathode terminals 510 and anode terminals 512 may be used to provide electrical current to cathode collectors 210 and anode collectors 212 respectively. Cathode terminals 510 and anode terminals 512 may further provide heat to or remove heat from battery 300 via cathode collectors 210 and anode collectors 212.

Figure 12:
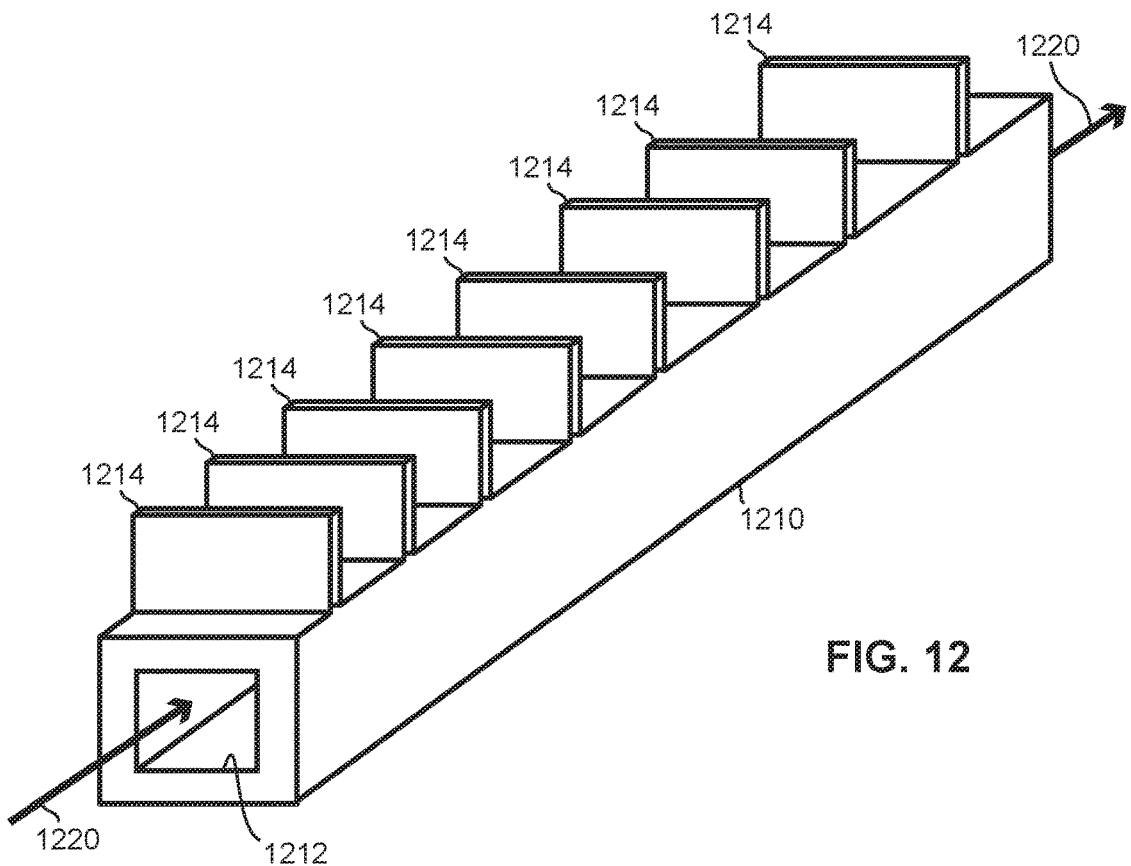
FIG. 12 is a perspective diagram of a terminal according to the present disclosure.

In an implementation of cathode terminal 510 and/or anode terminal 512, refer to terminal 1210 of FIG. 12, terminal 1210 includes one or more structures to increase the surface area of terminal 1210 to facilitate transfer of heat to or from battery 300. In an implementation, terminal 1210 includes fins 1214. Each fin mechanically and thermally couples to terminal 1210. Each fin 1214 increases the surface area of terminal 1210. Each fin 1214 decreases the thermal resistivity (e.g., increases thermal conductivity) between a medium (e.g., air, liquid) that surrounds terminal 1210 and the collectors (e.g., 210, 212) of battery 300. Terminal 1210 may include fins on all or just some sides of terminal 1210.

A terminal may include any type of structure for increasing the surface area of the terminal to facilitate heat transfer. For example, terminal 1210 may include fins that extend straight out from one or more sides of terminal 1210 as shown in FIG. 12. The space between fins is a factor in the efficiency of the energy transfer of the terminal. Fin spacing may be expressed as fins per inch ("FPI").

The spacing may be decreased (e.g., increased FPI) to increase the surface area of terminal 1230. Having the fins close to each other decreases the amount of medium (e.g., liquid) positioned between fins at any time. Closely spaced fins (e.g., 20-30 FPI) may restrict the flow of medium between the fins so that the temperature of the medium while between the fins changes more than a threshold. For example, the FPI may restrict medium flow so that the medium approaches its boiling point or freezing point while between fins thereby decreases the efficiency of heat transfer. Fin spacing and rate of flow of the medium to maintain efficient heat transfer are inversely proportional.

The space between fins may be increased (e.g., 5-18 FPI) so that the temperature change of the medium between fins is less than when the fins are closer together. An increased spacing between fins permits more medium to pass between fins so that the heat transferred to or from the medium has a lesser effect on the temperature of the medium between fins. Preferably, the change in the temperature of the medium between fins is less than a threshold. For example, the amount of medium between fins limits the change in the temperature of the medium between the fin so that it increases to within a threshold of its boiling point or decreases to with in a threshold of its freezing point. The threshold of temperature change may also be express as no more than a threshold difference between the temperature of the medium that is positioned between fins as compared to the temperature of the medium that is not positioned between fins.

Fins may be flared with respect to each other so that the distance between adjacent fins proximate to the terminal is less than the distance between the fins at a distance away from the terminal. Flaring increase the amount of medium that can pass between fins.

Fins may be shaped to increase the amount of time a medium moves between fins for a particular rate of flow. For example, fins may be V-shaped to increase a linear length along adjacent fins.

The surface area of a terminal may be increase by forming or attaching pins (e.g., cylindrical, rectangular) to the terminal. A cylindrical pin has a diameter and a height. A cylindrical pin extends a height from the terminal. A rectangular pin has a width and a depth that is about the same and extends a height from the terminal. Pins may be spaced to transfer heat to a medium as discussed above with respect to fins. Pins may be flared with respect to each other.

The thickness of fins or pins may be decreased or increased to increase or decrease respectively the transfer of heat via the fins or pins.

Fins or pins may be formed of a material that is different from the material of the terminal to increase or decrease the efficiency of heat transfer via the fins.

In another implementation of terminal 1210, terminal 1210 includes channel 1212. A medium (e.g., fluid, liquid) flows through channel 1212 along flow path 1220. The medium facilitates the transfer of heat to or removal of heat from battery 300 via anode collector 212 and cathode collector 210 of battery 300.

In another implementation of terminal 1210, terminal 1210 includes both fins 1214 (or pins) and channel 1212.

Figure 8:
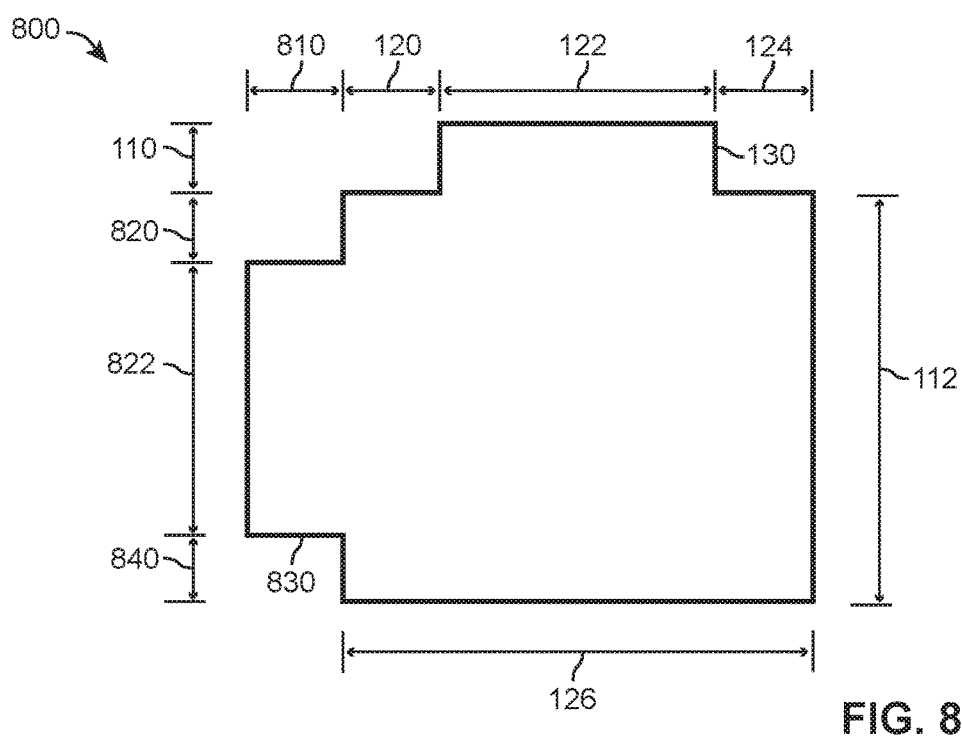
FIG. 8 is a diagram of another implementation of a collector of a battery according to the present disclosure.
Figure 9:
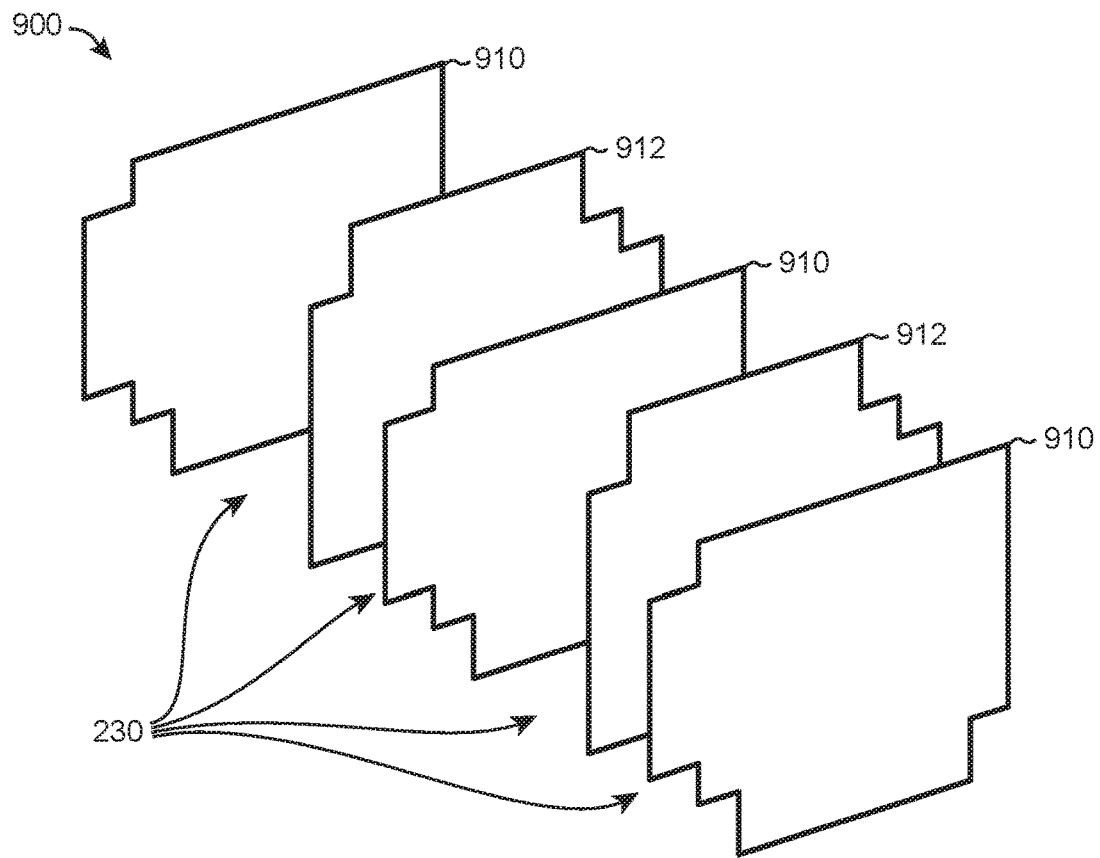
FIG. 9 is a perspective view of a plurality of collectors of FIG. 8 arranged for a battery cell according to the present disclosure.
Figure 10:
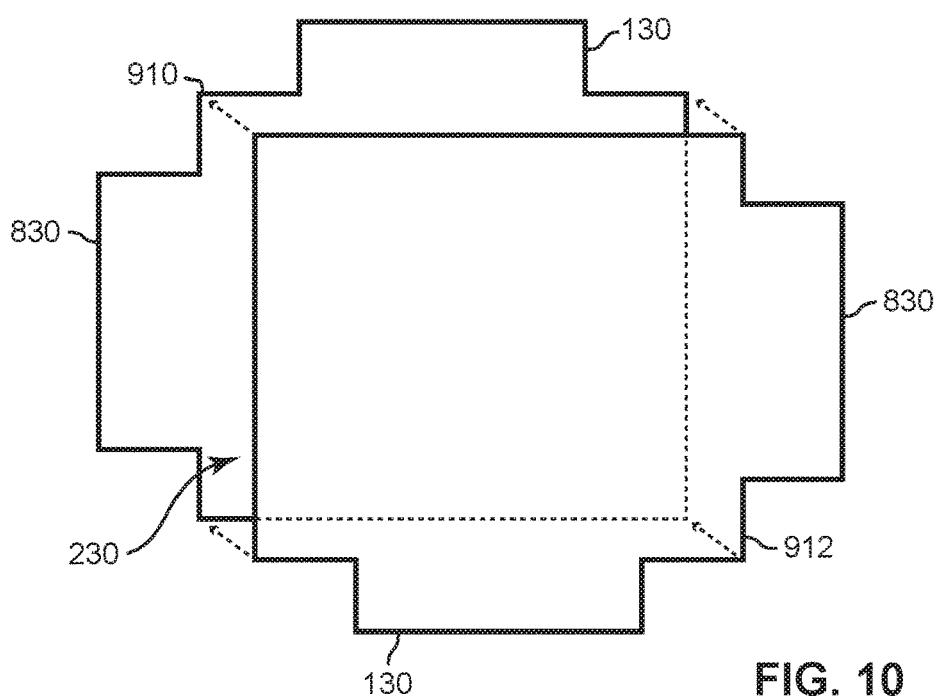
FIG. 10 is a diagram of two collectors of FIG. 8 positioned to establish tabs for an anode and a cathode.

Another implementation of battery 300 includes collectors that have the shape and characteristics of collector 800, shown in FIGS. 8-10. The characteristics of collector 800 may include the characteristics of a collector discussed above. Collector 800 is formed of a thin sheet of material. Collector 800 includes an area defined by width 126 and height 112 as discussed above. Preferably, width 126 is equal to height 112 to facilitate aligning the active areas of cathode and anode collectors. Collector 800 includes tab 130, as discussed above, and tab 830. Tab 830 may include all of the characteristics and perform the functions of a tab as discussed above. Tab 830 may be substantially the same as tab 130, except for orientation and possibly width depending on the width 126 and height 112 of collector 800.

Tab 130 extends from the area of collector 800 in a first direction. Tab 830 extends from the area of collector 800 in a second direction. In the implementation shown in FIG. 8, tab 130 extends from the area in a direction of 0 degrees, while tab 830 extends from in a direction of 270 degrees. The difference in the directions of orientation of tab 130 and tab 830 is 90 degrees.

The width of tab 830 is width 822. The height of tab 830 is height 810. Width 822 is at least 70 percent of height 112. Preferably, width 822 is at least 80 percent of height 112. Preferably, width 820 and 840 are equal so that tab 830 is centered with respect to height 112. Height 810 of tab 830 is sufficient to permit tab 830 to couple to a terminal. As discussed above with respect to tab 130, the width of tab 830 reduces electrical and/or thermal resistance between the terminal to which the tab is coupled and the area of the collector.

Two or more collectors 800 are positioned with respect to each other to form cathode collectors 910 and anode collectors 912 of a battery. In placement 900, cathode collectors 910 and anode collectors 912 are alternately positioned with respect to each other. In placement 900, cathode collectors are positioned so that tab 130 and tab 830 of each cathode collector 910 are oriented downward (e.g., 180 degrees) and to the left (e.g., 270 degrees) respectively, while anode collectors are oriented so that tab 130 and tab 830 of each anode collector 212 are positioned upward (e.g., 0 degrees) and to the right (e.g., 90 degrees) respectively. The area (e.g., height 112 by width 126) of cathode collector 910 aligns with area of anode collector 912 so that tab 130 and tab 830 of cathode collectors 210 extend from the bottom and left respectively of placement 900 while tab 130 and tab 830 of anode collectors 212 extend from the top and right respectively of placement 900. Tabs 130 and 830 of anode collectors 912 do not overlap tabs 130 and 830 of cathode collectors 910. Further, tabs 130 and 830 of the anode collectors 912 do not overlap that area of the cathode collectors 910 and tabs 130 and 830 of cathode collectors 910 do not overlap the area of the anode collectors 212.

In another implementation, the tab 130 of collector 800 is oriented at 0 degrees and tab 830 is oriented at 180 degrees. For this implementation, the placement of cathode collectors 910 with respect to anode collectors 912 orients tab 130 and tab 830 of cathode collectors at 0 degrees and 180 degrees respectively while tab 130 and tab 830 of anode collectors are oriented at 90 and 270 degrees respectively. Tabs 130 and 830 of anode collectors 912 do not overlap tabs 130 and 830 of cathode collectors 910. Tabs 130 and 830 of anode collectors 912 do not overlap that area of cathode collectors 910 and tabs 130 and 830 of cathode collectors 910 do not overlap the area of anode collectors 912.

Chemistry 230 is positioned in between cathode collectors 910 and anode collectors 912 in the area defined by height 112 and width 126. Chemistry 230 includes any of the chemistries (e.g., chemicals, compounds, elements) discussed above. Chemistry 230 includes any chemistry suitable for the material of cathode collectors 910 and anode collectors 912. Chemistry 230 may come into contact with cathode collector 910 and/or anode collector 912. Chemistry 230 may adhere (e.g., stick) to cathode collector 910 and/or anode collector 912. Chemistry 230 does not contact tab 130 or tab 830 of cathode collectors 910 or anode collectors 212. Chemistry 230 interacts with cathode collectors 910 and anode collectors 912 to perform the functions of the battery, such as storing and providing a current.

Anode terminal 512 couples to tab 130 and tab 830 of each anode collector 912. Cathode terminal 510 couples to tab 130 and tab 830 of each cathode collector 910. As discussed above with respect to tab 130, tab 130 and tab 830 of each collector couples to its respective terminal along the entire width (e.g., 122) of tab 130 and along the entire width (e.g., 822) of tab 830 to provide parallel paths along tab 130 and tab 830 for current flow to and from the collector and heat transfer to and from the collector. The wide, parallel paths through tab 130 and tab 830 present a low electrical and/or thermal resistance to currents and heat that enter and leave the collector.

In addition to the width of tabs 130 and 830, having two tabs (e.g., 130, 830) per collector provide two parallel paths to the area (e.g., height 112 by width 126) of the collector thereby further reducing electrical and thermal resistance within battery 300. Two tabs per collector increases the surface area of the terminals coupled to a collector thereby improving heat transfer to and from battery 300. Two tabs per collector decreases the electrical resistance between the terminals and the area of the collector thereby providing greater current density of currents to and from battery 300. Two tabs per collector improves both the electrical and thermal characteristics of battery 300.

Tabs 130 and 830 of each collector couple to a terminal as discussed above. Tabs 130 and 830 of each collector couple to its terminal along the entire width (e.g., 122, 822) of tab 130 and tab 830 to provide a low resistance path between the terminal and the area of the collector. Current and heat may be transferred to and from each collector as discussed above.

A battery may include temperature sensors. Temperature sensors may sense the temperature of a terminal, the chemistry, a case, and/or a collector of a battery.

A battery may include temperature sensors. A temperature sensor may be positioned inside a battery. A temperature sensor may be positioned in a case of the battery. A temperature sensor may be positioned on or in a terminal of a battery. A temperature sensor may be positioned in a chemistry of the battery. A temperature sensor may report a magnitude of the temperature that it detects. A temperature sensor may report a temperature of a collector, the chemistry, a case, and/or a terminal of a battery. A temperature sensor may report its position (e.g., location). A temperature sensor may sensor may report its position relative to the structure of the battery (e.g., which collector, which terminal, which part of chemistry, which part of the case). A temperature sensor may report its position relative to the structure of a battery module (e.g., which battery in the module). A temperature sensor may report its position relative to the structure of a battery and the structure of a battery module.

For example, battery 700 includes temperature sensors 710, 712, 714, 716, 718 and 720. A battery may include one or more of temperature sensors 710, 712, 714, 716, 718 and 720. Temperature sensor 710 and 720 detect and report the temperature of cathode terminals 510 and anode terminals 512 respectively. Temperature sensor 714 and 716 detect and report the temperature of one or more collectors, case 550, and/or the chemistry in a portion of the battery proximate to anode terminal 512 and cathode terminal 510 respectively. Temperature sensor 718 detects and reports the temperature of one or more collectors and/or the chemistry in a center portion of the battery. Temperature sensor 720 detects the temperature of a collector and/or the case on a side of the battery.

A temperature sensor may report a detected temperature as analog and/or digital information. A temperature sensor may report information to a processing circuit. A temperature sensor may include a bus for providing analog and/or digital information to a processing circuit. A bus may include two or more conductors for carrying an electrical signal from a temperature sensor to a processing circuit.

The components of a battery may include an identifier (e.g., number, letter, alphanumeric) to identify the portion of the battery where the temperature sensor is placed. The identifiers for each components of a battery may be different. For example, anode terminal 512 may have one identifier (e.g., TN01) and cathode terminal 510 may have another identifier (e.g., TP01). If a battery has more than one terminal, each terminal may have a different identifier. Each collector may include an identifier. For example, anode collectors 212 may be identified from left to right in FIG. 7 as AC01, AC02, AC03, and AC04. Cathode collectors 210 may be identified from left to right as CC01, CC02 and so forth. The internal volume of a battery may be divided into smaller volumes and assigned identifiers. The position of collectors may be used to subdivide the volume of a battery. A case may be divided into portions with associated identifiers.

A temperature sensor may include an identifier. Information regarding the location of a temperature sensor with respect to a battery may be programed into a temperature sensor. For example, temperature sensor 716 may be programmed with an identifier indicating its proximity to anode collector AC03, cathode connector CC02 and/or the location proximate to cathode terminal 510. Temperature sensor 718 may be programed with an identifier indicating its proximity to anode collector AC03, cathode connector CC03, and the central portion of the battery. Temperature sensor 720 may be programed with an identifier indicating its position in the center of the left side of case 550. Each time a temperature sensor reports the temperature it detects, the temperature sensor reports the detected temperature, its own identifier and the programmed identifier for the location of the temperature sensor in the battery.

In another implementation, a temperature sensor may include an identifier. A processing circuit stores information as to the location of each temperature sensor in a battery or each temperature sensor in a battery module. The location information stored by the processing circuit may be stored relative to the identifier for each temperature sensor in the battery and/or the module. Each time a temperature sensor reports the temperature it detects, the temperature sensor reports the detected temperature and its own identifier. The processing circuit uses the identifier of the temperature sensor to lookup the location of the sensor in the battery and/or the battery module.

A processing circuit may use the combination of detected temperature and the location of the detected temperature to detect portions of a battery or a battery module that are not within a desired temperature range. A processing circuit may use temperature and location information to adjust the heating or cooling of a portion of a battery, a battery as a whole, a portion of a battery module, or the battery module as a whole.

Batteries may be combined to form a battery module. Batteries may be electrically coupled in parallel and/or in series to form a battery module. The terminals of the batteries may be electrically coupled together to accomplish the parallel and/or serial coupling between the batteries. The terminals of the batteries may couple together to form a cathode terminal and an anode terminal of the battery module. The battery module provides and receives a current via the cathode terminal and the anode terminal of the battery module.

In an implementation, 95 batteries are coupled in series to form a battery module. Each battery provides a nominal 3.7 volts. Because the batteries are connected in series, the battery module may provide up to about 351 volts. The battery module may provide up to 200 amps of current.

The terminals of the batteries may be coupled together to form a manifold. A manifold includes one or more channels for flow of a medium (e.g., liquid) to transfer heat to or from the batteries of the battery module. For example, batteries may include terminals such as terminal 1210. The terminals of such batteries may be coupled together to form one or more channels (e.g., channel 1212) for the flow of a medium to transfer heat to and from the batteries. The terminals of the batteries so coupled together to provide one or more channels is referred to herein as a manifold. The terminals that form a manifold may include structures (e.g., fins, pins) for increasing the surface area of the manifold to facilitate heat transfer.

For example, batteries 1330 electrically couple together to form battery module 1130. The terminals of batteries 1330 mechanically couple to form cathode terminal 1310 and anode terminal 1312 of battery module 1130. Cathode terminals 1310 and anode terminals 1312 form manifold 1360. Heat transfer medium 1350 flows through the cathode portion of manifold 1360. Heat transfer medium 1352 flows through the anode portion of manifold 1360. Heat transfer medium 1350 and heat transfer medium 1352 may transfer heat to or remove heat from batteries 1330. Batteries 1330 and manifold 1360 may be in contact with and/or submersed in heat transfer medium 1340. Heat transfer medium 1340 is contained in container 1320. Heat transfer medium 1340 may circulate in container 1320. Heat transfer medium 1340 transfers heat to and from manifold 1360 and/or batteries 1330.

The terminals that form cathode terminal 1310 electrically couple to each other to provide a current to or from batteries 1330. The terminals that form cathode terminal 1310 mechanically couple to provide a channel through which a heat transfer medium flows. The terminals that form anode terminal 1312 electrically couple to each other to provide a current to or from batteries 1330. The terminals that form anode terminal 1312 mechanically couple to provide a channel through which a heat transfer medium flows. The flow of a heat transfer medium through the manifold transfers heat to or from the collectors of batteries 1330 via the terminals.

Figure 13:
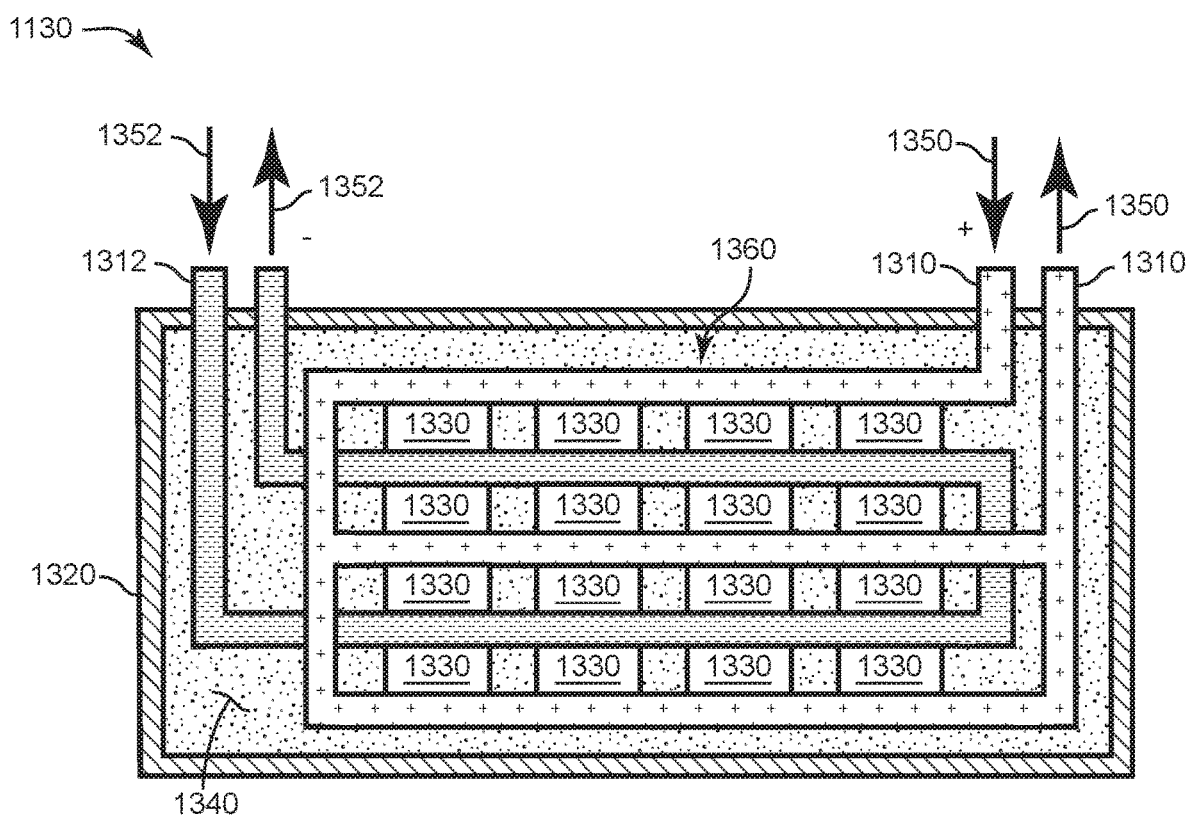
FIG. 13 is a diagram of a battery module according to the present disclosure.

The terminals of batteries 1330, whether cathode terminal 510 or anode terminal 512, that form cathode terminal 1310 and anode terminal 1312 depends on whether batteries 1330 are connected in series or in parallel. The connection shown in FIG. 13 shows batteries 1330 connected in parallel. Because batteries 1330 are connected in parallel, the cathode terminals 510 of each battery 1330 couple to form cathode terminal 1310, while anode terminals 512 of each battery 1330 couple to form anode terminal 1312.

In an implementation in which batteries 1330 are coupled in series, anode terminal 512 of the battery that is first in the series forms anode terminal 1312, while cathode terminal 510 of the battery that is last in the series forms cathode terminal 1310. The connection of cathode terminal 510 to anode terminal 512 of a battery that is not at the start or end of the series (e.g., intermediate battery) required structure (e.g., conduit, pipe) to transport heat transport medium without shorting to the electrical connection of between other intermediate batteries. Intermediate batteries may have separate conduits for medium flow for the cathode terminal 510 and anode terminal 512 of each intermediate battery, so the series connection between intermediate batteries do not short each other out.

Heat transfer medium 1350 flows through the channel formed in cathode terminal 1310. Heat transfer medium 1352 flows through the channel formed in anode terminal 1312. Heat transfer mediums 1350, 1352, and 1340 include any liquid suitable for transferring heat. Heat transfer mediums 1350, 1352, and 1340 may include water and mineral oil. Heat transfer mediums 1350, 1352, and 1340 may include a medium that changes phase to transfer heat.

Battery 1330 may be any type of battery discussed above. Battery 1330 may include collectors that have a single tab per collector. Battery 1330 may include collectors that have two tabs per collector. Battery 1330 includes terminals with a channel for the flow of a heat transfer medium. The terminals of battery 1330 may include structures for increasing the surface area of the terminals. Battery 1330 may include temperatures sensors. The temperature sensors of batteries 1330 may report a detected temperature and the location of the temperature sensor in battery 1330 or the location of the battery 1330 in battery module 1130.

Information related to the location of a temperature sensor may include a location in the battery, as discussed above, and a location in the battery module. For example, the location of a battery may be expressed as the column and row where the battery is positioned. The battery at row 0, column 0 would be the battery on the lowest row of batteries and to the furthest left. The battery at row 1, column 3 is the battery that is one row up from the lowest row and in the column that is the furthest to the right. As discussed above, a temperature sensor may be programed with its location information or the location information may be stored by a processing circuit and access using the temperature sensor identifier.

Figure 11:
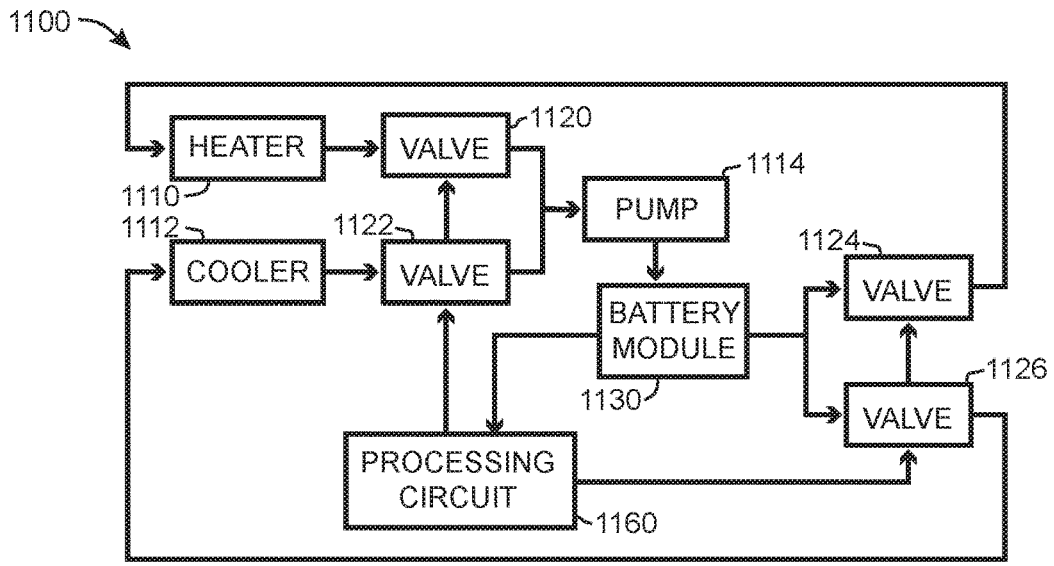
FIG. 11 is a block diagram of a system for regulating the temperature of a battery module.

System 1100 of FIG. 11 regulates the temperature of the batteries 1330 of battery module 1130. System 1100 includes heater 1110, cooler 1112, valve 1120, 1122, 1124, and 1126, pump 1114, battery module 1130 and processing circuit 1160.

A processing circuit includes any circuitry and/or electrical or electronic component for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, memory, and/or communication circuitry.

A processing circuit may include passive electronic devices (e.g., resistors, capacitors, inductors) and/or active electronic devices (op amps, comparators, analog-to-digital converters, digital-to-analog converters, programmable logic, SRCs, transistors). A processing circuit may include data buses, output ports, input ports, timers, memory, and/or arithmetic units.

A processing circuit may provide and/or receive electrical signals whether digital and/or analog in form. A processing circuit may provide and/or receive digital information via a data bus using any protocol. A processing circuit may receive information, manipulate the received information, and provide the manipulated information. A processing circuit may analyze information and perform an operation in accordance with the analysis. A processing circuit may store information and retrieve stored information. Information received, stored, analyzed, and/or manipulated by the processing circuit may be used to perform a function, control a function, and/or to perform a stored program.

A processing circuit may control the operation and/or function of other circuits and/or components of a system such as electromechanical components (e.g., valve, cooler, pump). A processing circuit may receive status information regarding the operation of other components, perform calculations with respect to the status information, and provide commands (e.g., instructions) to one or more other components. A processing circuit may command another component to start operation, continue operation, alter operation, suspend operation, or cease operation. Commands and/or status may be communicated between a processing circuit and other circuits and/or components via any type of bus (e.g., SPI bus) including any type of data/address bus.

Valve 1120-1126 permits a flow of a medium (e.g., liquid) along a path or blocks the flow of medium along the path. Valve 1120-1126 may permit a flow of medium at a specified rate of flow. Valve 1120-1126 may be controlled by an electrical signal. A processing circuit may provide the signal for controlling valves 1120-1126.

Heater 1110 may prepare (e.g., condition) a medium for transferring heat to battery module 1130. A cooler may prepare a medium for transferring heat from battery module 1130.

Pump 1114 may control the flow of medium in the fluid circuits of system 1100 and in the manifold of battery module 1130. Pump 1114 may push or pull a flow of medium into or out of manifold 1360 of battery module 1130. Pump 1114 may circulate heat transfer medium 1340 in container 1320. Pump 1114 may establish a rate of flow of a medium. Pump 1114 may increase, decrease, or maintain a rate of flow of a medium. Pump 1114 may provide a laminar flow of medium.

For example, processing circuit 1160 receives information from the temperature sensors of battery module 1130. Processing circuit 1160 may use the temperature sensor identifier to access a database that stores the location of each temperature sensor in battery module 1130 and respective battery 1330. Processing circuit 1160 may use the temperature information from the temperature sensors and the location information to control heater 1110, cooler 1112, valve 1120, valve 1122, valve 1124, valve 1126, and pump 1114. Processing circuit 1160 may control the components of system 1100 to maintain the temperature of battery module 1130 at a particular temperature. Processing circuit 1160 may maintain the temperature of battery module 1130 within a range of temperatures.

Temperature sensors may also be positioned in heat transfer medium 1340, in container 1320, on container 1320, on an outside surface of container 1320, inside a channel of manifold 1360, or in a fluid circuit of system 1100. Temperature systems may be positioned before or after heater 1110, cooler 1112, valves 1120-1126, pump 1114, and battery module 1130. Processing circuit 1160 may use this temperature information when adjusting the components of system 1100 to control the temperature of battery module 1130.

To transfer heat to battery module 1130, processing circuit 1160 may open valve 1120 and valve 1124, and close valve 1122 and valve 1126 to steer medium through heater 1110 before it enters battery module 1130. To transfer heat from battery module 1130, processing circuit 1160 may open valve 1122 and valve 1126, and close valve 1120 and valve 1124 to steer medium through cooler 1112 before it enters battery module 1130. Processing circuit 1160 may alternately open and close valves to maintain the temperature of battery module 1130.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to location in the specification, whether specific or general, shall be construed to refer to any location in the specification whether the location is before or after the location indicator.

Methods described herein are illustrative examples, and are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. A rechargeable battery comprising:
  a plurality of collectors, each collector includes an area and a tab, the tab extends from the area, the plurality of the collectors divided into a first group and a second group;
  a first terminal; and
  a second terminal; wherein:
    a width of the tab of each collector is at least 70 percent of a width of the area;
    each collector of the first group is positioned between two collectors of the second group or to a side of one collector of the second group;
    the tab of each collector of the first group is oriented in a first direction;
    the tab of each collector of the second group is oriented in a second direction;
    the first direction is different from the second direction by at least 90 degrees;
    each tab of the first group electrically couples to the first terminal along a width of the tab; and
    each tab of the second group electrically couples to the second terminal along a width of the tab;
    the plurality of collectors provide a current via the first terminal and the second terminal;
    at least one of the first terminal and the second terminal includes a channel formed therein; and
    a heat transfer medium flows through the channel to provide heat to or remove heat from the plurality of collectors coupled to the at least one of the first terminal and the second terminal.

2. The rechargeable battery of claim 1 further comprising a plurality of units of chemicals, wherein:
  one unit of chemicals is positioned between the area of each collector of the first group and the area of each collector of the second group; and the unit of chemicals cause the collectors of the first group to function as cathode collectors and the collectors of the second group to function as anode collectors.

3. The rechargeable battery of claim 2 wherein one unit of chemicals includes an anode active material, a cathode active material, a separator, and an electrolyte.

4. The rechargeable battery of claim 3 wherein the anode active material of any one unit of chemicals is positioned against the area of one collector of the second group.

5. The rechargeable battery of claim 3 wherein the cathode active material of any one unit of chemicals is positioned against the area of one collector of the first group.

6. The rechargeable battery of claim 1 wherein a unit of chemicals positioned between any two collectors does not contact the tab of either collector.

7. The rechargeable battery of claim 1 wherein the first terminal and the second terminal include at least one of fins and pins to increase a surface area of the first terminal and the second terminal.

8. The rechargeable battery of claim 1 wherein the tab of any collector of the first group does not overlap the tab of any collector of the second group.

9. The rechargeable battery of claim 1 wherein the current flows along an entire width of the tab of each collector.

10. A rechargeable battery comprising:
a plurality of anode collectors, each anode collector includes a first area having a first width and a first height, a first tab and a second tab, wherein the first tab extends from the first area in a first direction, wherein the second tab extends from the first area in a second direction, wherein a width of the first tab and a width of the second tab is at least 70 percent of at least one of the first width and the first height;
a plurality of cathode collectors, each cathode collector includes a second area having the first width and the first height, a third tab and a fourth tab, wherein the third tab extends from the second area in a third direction, wherein the fourth tab extends from the second area in a fourth direction, wherein a width of the third tab and a width of the fourth tab is at least 70 percent of at least one of the first width and the first height; a first terminal; and a second terminal; wherein:
each anode collector of the plurality of anode collectors is positioned between two cathode collectors of the plurality of cathode collectors or to a side of one cathode collector of the plurality of cathode collectors, whereby the first and second tabs of the plurality of anode collectors do not overlap the third and fourth tabs of the plurality of cathode collectors;
the first and second tabs of each anode collector electrically couple to the first terminal along the width of the first and second tabs;
the third and fourth tabs of each cathode collector electrically couple to the second terminal along the width of the third and fourth tabs; and
the plurality of anode collectors and the plurality of cathode collectors provide a current via the first terminal and the second terminal,
wherein the second direction is the first direction plus 90 degrees, the third direction is the first direction plus 180 degrees, and the fourth direction is the first direction plus 270 degrees.

11. The rechargeable battery of claim 10 wherein at least one of the first terminal and the second terminal includes a channel formed therein.

12. The rechargeable battery of claim 11 wherein a heat transfer medium flows through the channel to provide heat to or remove heat from the plurality of anode collectors or cathode collectors coupled to the first terminal and the second terminal respectively.

13. The rechargeable battery of claim 11 wherein the at least one of the first terminal and the second terminal that includes the channel formed therein further includes a plurality of fins.

14. The rechargeable battery of claim 10 wherein the current flows through the first and second tabs of each anode collector and the third and fourth tabs of each cathode collector.

15. The rechargeable battery of claim 10 wherein the current flows through an entire width of the first tab, the second tab, the third tab and the fourth tab.

16. The rechargeable battery of claim 10 further comprising a plurality of units of chemicals, wherein:
each unit of chemicals is positioned between the first area of one anode collector of the plurality of anode collectors and the second area of one cathode collector of the plurality of cathode collectors;
no unit of chemicals contacts the first tab or the second tab of any anode collector; and
no unit of chemicals contacts the third tab or the fourth tab of any cathode collector.

17. A rechargeable battery comprising:
a plurality of anode collectors, each anode collector includes a first tab and a first area having a first width, wherein the first tab extends from the first area, wherein a width of the first tab is at least 70 percent of the first width;
a plurality of cathode collectors, each cathode collector includes a second tab and a second area having the first width, wherein the second tab extends from the second area, wherein a width of the second tab is at least 70 percent of the first width; a first terminal; and a second terminal; wherein: each anode collector is positioned between two cathode collectors or to a side of one cathode collector; the first tab of each anode collector is oriented in a first direction;
the second tab of each cathode collector is oriented in a second direction, the first direction is different from the second direction by at least 90 degrees, whereby the first tabs of the plurality of anode collectors do not overlap the second tabs of the plurality of cathode collectors;
each first tab of the plurality of anode collectors electrically couples to the first terminal along the width of the first tab;
each second tab of the plurality cathode collectors electrically couples to the second terminal along the width of the second tab;
the plurality of anode collectors and the plurality of cathode collectors provide a current via the first tab, the second tab, the first terminal and the second terminal; and
at least one of the first terminal and the second terminal includes a channel formed therein,
wherein heat transfer medium flows through the channel to provide heat to or remove heat from the plurality of anode collectors or cathode collectors coupled to the first terminal and the second terminal respectively.

* * * * *